Patented Feb. 11, 1941

2,231,456

UNITED STATES PATENT OFFICE 2,231,456

COLORED TITANIUM PIGMENT

Holger H. Schaumann, Roselle, and Robert K. Whitten, Edgewood Hills, Del., assignors to E. I. du Pont de Nemours & Company, Wilmington, Del., a corporation of Delaware No Drawing. Application December 6, 1938,
Serial No. 244,175

7 Claims. (Cl. 134—58)

This invention relates to the art of titanium oxide pigments. More particularly it relates to a process for controlling the tint of colored titanium oxide pigments. Still more particularly, it relates to a process for producing buff titanium dioxide pigments of predetermined and improved shade and subordinate tint.

U. S. Patent 2,062,137 discloses a process by which buff titanium dioxide pigments may be produced by calcining, at a temperature of at least 800° C., an intimate mixture of a compound of titanium dioxide or hydrated titanium dioxide, with a compound of chromium. The buff titanium dioxide pigments thereby produced are definitely superior to prior art mixtures of white pigments and colored pigments such as chrome yellow, iron oxide, and the like, formerly employed in buff paints. For instance, the employment of said buff titanium dioxide pigments in outside paints such as oil type paints, orthodox and alkyd resin enamels, pyroxylin lacquers, and the like, applied to wood, metal, etc., exposed to the elements, results in films which chalk definitely less than do those comprising the aforementioned prior art pigment mixtures. Furthermore, when the hereinbefore described buff titanium dioxide pigment comprising films do chalk on excessive exposure, the chalk is colored and the objectionable whitening effects noted when paints containing mixtures of white and colored pigments are employed are not evident.

However, the employment of said buff titanium dioxide pigments has been greatly limited because of the variable and often undesirable subordinate tints of said buff pigments. The predominating subordinate tints of these buff pigments are yellow and red, although pigments with greenish and with brownish subordinate tints are also sometimes produced. It has been our experience that the subordinate tints of a buff titanium dioxide pigment manufactured according to the process of U. S. Patent 2,062,137, which prior to our present discovery was the only process known for the production of buff titanium dioxide pigments, could not be predicted. The subordinate tints of buff pigments made according to this process under apparently identical conditions and employing identical amounts of chromium compounds varied widely.

This invention has as an object the controlling of subordinate tints in buff titanium pigments. A further object is the production of buff titanium pigments having predetermined subordinate tints. A still further object is the provision of buff titanium dioxide pigments having desirable and predetermined subordinate tints, which, when formulated in coating compositions and applied to wood, metal, and the like, exposed to the elements, provide films of improved durability and increased fade resistance. Additional objects will become apparent from an examination of the following description and claims.

These objects and advantages are accomplished by the following invention which broadly comprises calcining an intimate mixture of a titanium pigment, a chromium compound, and an alkali metal salt, said calcination being conducted for a part of the time in a carbon monoxide free atmosphere and for a part of the time in a carbon monoxide comprising atmosphere.

In a more restricted sense this invention comprises taking an intimate mixture comprising titanium pigment, between about 0.02% and about 2%, calculated as elemental chromium and based upon the weight of the titanium pigment, of a chromium compound, and between about 0.3% and about 3%, calculated as potassium and based upon the weight of the titanium pigment, of a potassium salt and calcining said mixture in a carbon monoxide free atmosphere for a period of not more than about 5 hours and thereafter in a carbon monoxide comprising atmosphere for a period of not more than about 2 hours, said calcination being carried out at a temperature between about 800° C. and about 1050° C. Thereafter the pigment is cooled in an oxygen comprising atmosphere substantially free from carbon monoxide.

The preferred embodiment of this invention comprises taking an aqueous suspension of a titanium dioxide pigment which pigment is substantially free from color imparting impurities and adding thereto between about 0.03% and about 0.75%, calculated as elemental chromium and based upon the weight of the titanium dioxide, of chromic acid, and from about 0.3% to about 3%, calculated as potassium and based upon the weight of the titanium dioxide, of potassium carbonate and calcining at a temperature between about 900° C. and about 1050° C. in a carbon monoxide free oxygen comprising atmosphere for a period of not more than about two hours and thereafter continuing said calcination in a carbon monoxide comprising atmosphere, comprising from about 0.1% to about 2% carbon monoxide, at a temperature between about 900° C. and about 1050° C. for a period of time not exceeding about one hour. The resulting pigment is cooled to a temperature of not less than about 400° C. in a carbon monoxide free atmosphere, and subsequently dry milled or wet milled and then dewatered as by filtering, dried and dry milled to break up the lumps formed on drying.

The following examples are given for illustrative purposes and are not intended to place any restrictions or limitations on the herein described invention. In these examples the titanium dioxide employed was the filtered, washed precipitate obtained by hydrolysis of a titanium sulfate solution. Dry potassium carbonate and a solution of $CrO_3$ comprising 150 grams Cr per liter were added to said precipitate to provide a mixed slurry, which was then stirred adequately to insure complete dispersion of the chromium salt and the dissolved potassium carbonate throughout the mass of the titanium dioxide slurry. The resultant treated pulp was dried to a water content of about 30% and the moist pigment cake so formed was calcined as hereinbelow described.

*Example I*

A moist pigment cake was prepared in the aforementioned manner, said cake comprising 100 parts by weight $TiO_2$, 0.162 part by weight chromium, and 0.863 part by weight $K_2CO_3$. Portions of the aforementioned pigment cake were calcined to a temperature of 950° C. in an externally electrically heated rotating calciner in contact with carbon monoxide free air and in contact with carbon monoxide comprising atmospheres. The carbon monoxide comprising atmospheres were obtained by incomplete combustion of illuminating gas over the charge. The illuminating gas employed comprised 14.9% carbon monoxide, 5.1% carbon dioxide, 30.3% saturated hydrocarbons, 26.7% hydrogen, 18.8% nitrogen, and 0.6% oxygen. Said illuminating gas was burned under such conditions that it provided an atmosphere comprising from about 0.05% to about 5% carbon monoxide.

A portion of the aforementioned pigment cake was calcined at 950° C. during a period of 30 minutes as hereinbefore described in an atmosphere of carbon monoxide free air and was then cooled to below 400° C. in air during a period of 7 seconds. A buff titanium dioxide pigment having a very definite red undertone was thereby produced. Another portion, calcined in a similar manner but allowed to cool in air to a temperature of about 750° C. during a period of 20 minutes and then cooled to 400° C. in 7 seconds, produced a buff titanium dioxide pigment substantially equal in depth of shade and red undertone to that obtained when the pigment was cooled rapidly.

Another portion of the aforementioned pigment cake was heated to 920° C. during a period of 20 minutes as hereinbefore described in an atmosphere of carbon monoxide free air, whereupon an atmosphere comprising 2% carbon monoxide was provided in said calciner and the temperature of the charge was increased to 950° C. during an additional period of 10 minutes. The calcined pigment, so produced, was cooled in air to 400° C. in 9 seconds and produced a buff titanium dioxide pigment which had a yellow undertone and was lighter in shade, i. e., had a higher value as defined by the Munsell color scale, than the comparable buff titanium dioxide pigment which was subjected to a carbon monoxide free atmosphere throughout the whole calcination operation. Another portion, calcined in a similar manner but allowed to remain in contact with atmospheric air for 20 minutes while cooling from 950° C. to 700° C., and then cooled in 8 seconds time from 750° C. to 400° C., produced a buff pigment which was essentially equal in tint and depth of shade to the comparable yellow-buff tinted titanium dioxide which had been cooled rapidly.

Another portion of the aforementioned pigment cake was calcined to 870° C. as hereinbefore described in an atmosphere of carbon monoxide free air during a period of 10 minutes, whereupon an atmosphere comprising 2% carbon monoxide was provided in the rotating calciner and heating was continued for an additional 20 minutes when a temperature of 950° C. was obtained. The resultant calcined pigment was cooled in air to a temperature of 400° C. during a period of 10 seconds and provided a buff pigment which was definitely more yellow in undertone, and higher in value as defined by the Munsell color scale, than the pigment samples heretofore obtained.

Another portion of the aforementioned pigment cake was calcined to 950° C. during a period of 30 minutes as hereinbefore described in an atmosphere comprising 2% carbon monoxide, and was then cooled to 400° C. in a period of 8 seconds. It produced a yellow-buff titanium dioxide pigment having a green undertone.

When the hereinabove buff titanium dioxide pigments having red subordinate tints were reheated to a temperature of 950° C. in a carbon monoxide comprising atmosphere, products of a slight yellow subordinate tint and of higher value as defined by the Munsell color scale were obtained. However, when the buff titanium dioxide pigments having yellow and having green subordinate tints were reheated to a temperature of 950° C. in an atmosphere of carbon monoxide free air, neither the subordinate tints, nor values as defined by the Munsell color scale, were affected.

*Example II*

A moist pigment cake prepared in the same manner as that employed in Example I, and comprising 2000 pounds by weight $TiO_2$, 0.195% chromium, and 0.863% $K_2CO_3$, on the basis of the $TiO_2$ weight, was charged into an internally fired rotating batch calciner. The calciner was fired with light fuel oil, and the flame was controlled to maintain a carbon monoxide free atmosphere over the charge during the first 3 hours of the calcination period when said charge had attained a temperature of 860° C. Pigment samples removed from the calciner at this time had a definite red subordinate tint. The volume of air entering the calciner was then reduced and the flame controlled to maintain an atmosphere comprising 0.5% carbon monoxide over the charge during the remaining hour of the calcination. At the end of this time the calcined pigment, which had attained a temperature of 940° C., was discharged from the calciner, whereupon its temperature was lowered to less than 400° C. in a relatively short period of time. A buff titanium dioxide pigment having a pleasing yellow undertone was thereby produced.

*Example III*

A moist pigment cake, identical with that employed in Example II, was calcined under the conditions of Example II except that the temperature of the charge was raised to 930° C. in an atmosphere of carbon monoxide free air during a period of 3½ hours and was then raised to a temperature of 960° C. during a period of ½ hour in an atmosphere comprising 0.5% carbon monoxide. The pigment so obtained was substantially equal in tint and value, as defined by the Munsell color scale, so that produced under the conditions of Example II.

It is to be understood that the hereinbefore disclosed specific embodiments of our invention may be subject to variation and modification without departing from the scope of this invention. For instance, while we prefer to employ in our calcination operation precipitated titanium dioxide such as that obtained by hydrolysis of titanium sulfate solutions, according to the process of U. S. Patent 1,851,487 or Reissue Patent 18,854, it is to be understood that we may employ titanium dioxide precipitated by other processes well known in the art or we may employ calcined titanium dioxide. However, it is to be understood that the titanium dioxide employed should be substantially free from color imparting impurities such as iron and the like.

We prefer to employ solutions of chromic acid as the color imparting compound in our process. However, it is to be understood that solutions of other salts of chromium such as ammonium, chromic sulfate, and the like, may be employed with equal facility. Furthermore, the advantages of this invention are obtained when chromium compounds other than those of the water soluble type are employed such as chromic hydroxide, chromic oxide, and the like.

The optimum amount of chromium compound associated with the titanium pigment during our novel calcination operation can best be learned by experimental trial and will vary with the type and previous history of the titanium pigment employed, the proportion of alkali metal salts to chromium, the calcination conditions, and the use requirements of the finished pigment. Other conditions being equal the value, as defined by the Munsell color scale, of the buff titanium pigments produced decreases and the chroma increases as the proportion of chromium to the titanium pigment is increased. While we prefer to use between about 0.02% and about 2%, and preferably between about 0.03% and about 0.75%, of chromium it is to be understood that we may employ amounts outside of this range without departing from the scope of this invention. For example, appreciable effects are obtained when one employs as little as about 0.01% and increasing effects are obtained when one employs as much as about 2.5% or more of chromium.

As is well-known in the art, and is more particularly disclosed, for example, in U. S. Patent 1,892,693, the pigment properties of white calcined titanium dioxide pigments are markedly improved by incorporating predetermined and usually minor amounts of an alkali metal compound in the precipitated titanium dioxide prior to the calcination operation. We have determined that the pigment properties of the novel buff titanium dioxide pigments of our invention are also improved markedly by the employment of said alkali metal salts. Moreover, we have discovered that the depth of the yellow subordinate tint of the buff pigments of our invention is affected to a considerable extent by the ratio of alkali metal salts to chromium employed in said process. We have discovered that increasing the ratio of alkali metal salts to chromium increases the rapidity with which the yellow tints of our novel pigments are developed when calcined in a carbon monoxide comprising atmosphere. For instance, a pigment mixture comprising 0.863 part by weight $K_2CO_3$ and 0.585 part by weight Cr per 100 parts $TiO_2$, which had been calcined to a temperature of 940°C. during a period of 3 hours in air to provide a buff pigment having a definite red undertone, required a 15 minute calcination at 940°C. in an atmosphere comprising 0.5% carbon monoxide to produce a desired yellow tint, whereas a pigment mixture identical in all respects except that its potassium carbonate content was increased to 1.73% on the basis of the $TiO_2$ weight, which had been calcined to a temperature of 940°C. during a period of 3 hours in air produced a buff pigment of the same shade and yellow tint upon calcination in an atmosphere comprising 0.5% carbon monoxide at 940°C. for only 5 minutes. Continued calcination at said temperature in said carbon monoxide comprising atmosphere for an additional 10 minutes resulted in the formation of a yellow pigment having a green subordinate tint.

While any alkali metal salt or admixture of said salts may be employed in our process, potassium salts are preferred on account of the superior results obtained therewith. Furthermore, potassium carbonate is our preferred potassium salt on account of the superior results obtained thereby.

The optimum amount of alkali metal salts associated in any instance with the chromium treated titanium dioxide during our novel calcination operation can best be learned by experimental trial and will depend on the type and previous history of the titanium dioxide employed, the amount of chromium salts, the calcination conditions, and the use requirements of the finished pigment. Appreciable effects are obtained when one employs as little as about 0.3% alkali metal salt, calculated as alkali metal on the basis of the $TiO_2$ weight. Increased effects are obtained when as much as about 3% or more alkali metal salt, calculated as alkali metal on the basis of the $TiO_2$ weight, is employed. It is preferred, however, that while the per cent of alkali metal salt should be in the range of from about 0.3 to about 3%, the ratio of alkali metal to chromium should also be in the range of from about 0.1 to about 10 parts alkali metal to 1 part by weight chromium.

The incorporation of the chromium and alkali metal compounds with the titanium dioxide can be effected in various ways. On account of the superior results obtained whereby, we prefer to add said compounds to an aqueous suspension of the precipitated titanium dioxide and thereafter to dewater said treated suspension prior to calcination of the same. However, since a certain amount of the chromium compound is lost during this dewatering operation we may prefer, on account of economic considerations, to incorporate the chromium and potassium compounds directly into the dewatered pigment cake. We can also add the chromium salt to a solution of a titanium salt, such as the sulfate or chloride, and then heat to effect hydrolysis. We can also, for instance, add an insoluble chromium compound to a titanium solution from which the titanium is subsequently precipitated, or add said chromium compound directly to a precipitated titanium compound, intimately mix the two, and then calcine the mixture.

Calcination may be effected in any of the types of calcining equipment well-known in the art, such at batch and continuous rotary calciners. Said calciners may be heated internally, for example, with oil or gas flames, or they may be heated externally, for example, electrically. However, when said calciners are heated externally, arrangements must be made in our invention to troduce carbon monoxide gas over the charge during the latter part of the calcination operation.

In practicing our invention it is desirable that the mixture of titanium dioxide and chromium and alkali metal salts should be calcined at a temperature between about 800° C. and about 1050° C. and preferably between about 900° C. and about 1050° C. Furthermore, said mixture should preferably be held at a temperature in said ranges for a period of not less than about 15 minutes, and not more than about 7 hours.

It is to be understood that calcination of the titanium dioxide/chromium/alkali metal mixture in a carbon monoxide free atmosphere, and more particularly in a carbon monoxide free oxygen comprising atmosphere, and subsequent calcination in a carbon monoxide comprising atmosphere is an essential feature of our invention. In order that a buff titanium dioxide pigment of desirable yellow undertone may be produced, it is essential that said pigment after calcination in air, for example, must be subjected at elevated temperatures to carbon monoxide comprising gases. Appreciable effects are obtained when said gases comprise as little as about 0.05% carbon monoxide. Increased effects are obtained when said gases comprise higher amounts of carbon monoxide, such as about 5% for example. Further increases in the carbon monoxide content of said gases results in no increase in the yellow tint of the resultant pigment and, in fact, is undesirable on account of the health hazard presented. For most ordinary purposes, we prefer to employ an atmosphere comprising from about 0.1% to about 2% carbon monoxide.

The optimum length of time to which the chromium comprising titanium dioxide mixtures are subjected to a carbon monoxide free atmosphere and then to an atmosphere comprising carbon monoxide can best be learned by experimental trial, and will depend on the type and previous history of the titanium dioxide pigment employed, the amount of chromium and alkali metal, the temperature to which the pigment is subjected, and the use requirements of the finished pigment. A buff titanium dioxide pigment of maximum red undertone or subordinate tint is produced when the calcination is carried to completion in a carbon monoxide free atmosphere as, for example, in atmospheric air. On the other hand a yellow titanium dioxide of maximum green undertone is obtained when the calcination is effected in a carbon monoxide comprising atmosphere.

While our invention has been described with particular reference to titanium dioxide pigments comprising substantially pure titanium dioxide, it is to be understood that it is applicable to all types of titanium oxygen compound pigment materials and admixtures of said materials with extenders, such as barium sulfate, calcium sulfate, lithopone, magnesium silicate, and the like. Examples of titanium oxygen compounds contemplated in this invention include, in addition to titanium dioxide, such pigment materials as calcium titanates, barium titanates, zinc titanates, and the like.

From our study of the factors involved in controlling subordinated tints and depth of shade of buff titanium dioxide pigments, we believe the effects observed by varying calcination conditions can be explained in the following manner.

While the exact states of combination of chromium and titanium in buff titanium dioxide pigments are unknown, we believe that at elevated temperatures such as are used for calcination, the change in tint produced by employing a carbon monoxide comprising atmosphere is due principally to a change in valence and, consequently, a change in color, of the color imparting metal compounds of chromium. It is well-known that $CrO_3$, and many chromium compounds in which the chromium is present as $Cr^{+6}$ are red to orange in color, while $Cr_2O_3$ and many compounds in which the chromium is present as $Cr^{+3}$ are dark green. The chemical reactions involved by a carbon monoxide comprising atmosphere may be expressed in terms of the oxides by the equation $$2CrO_3 + 3CO \rightarrow Cr_2O_3 + 3CO_2$$

If the calcination is carried out in a carbon monoxide free atmosphere, and preferably in one comprising oxygen, the above reaction does not take place and buff pigments with a red subordinate tint are produced. However, if a carbon monoxide comprising atmosphere is employed for a period of time during the calcination, said reaction will proceed with the formation of $Cr_2O_3$ or other trivalent chromium compounds which tend to neutralize the red subordinate tint and increase the yellow subordinate tint of the pigment. If calcination in the presence of carbon monoxide is prolonged to such an extent that the above reaction is carried to completion or nearly so, the resulting pigments are yellow buffs having a green undertone. Since the trivalent chromium compounds formed by reaction with carbon monoxide under calcination conditions are relatively stable, the yellow tints produced in the pigment are retained even if the pigment, so calcined, is subsequently subjected to elevated temperatures in a carbon monoxide free oxygen comprising atmosphere. For that reason, control of rate of cooling of said pigments in air or other oxygen comprising atmosphere which is substantially free from carbon monoxide, has no bearing on the tint of buff pigments. It should be pointed out that the carbon monoxide comprising atmosphere, hereinafter described, need not be free from oxygen, i. e., it need not be what is ordinarily termed a reducing atmosphere. Even though there is present substantial amounts of oxygen, the unexpected results are obtained, provided it comprises not less than 0.05% carbon monoxide, that the $CrO_3$ is reduced to the $Cr_2O_3$ condition by the carbon monoxide.

It is to be understood that we are merely offering the above theory as an explanation of the results which are obtained when our novel process is employed for the manufacture of buff titanium dioxide pigments, and are not in any way limited thereto.

Our process possesses advantages not previously combined in a single pigment manufacturing process. Furthermore, the pigment products of our novel process possess advantages not previously combined in pigment materials. For example, our novel process permits the manufacture of buff titanium dioxide pigments of predetermined desirable red or yellow subordinate tints. Furthermore, modification of our preferred process as hereinbefore described, permits the manufacture of buff titanium dioxide pigments having predetermined subordinate tints other than yellow, namely, red and green. Furthermore, the buff titanium dioxide pigment products of our novel process are definitely superior to prior art mixtures of a white pigment and a colored pigment, such as chrome yellow, iron oxide, and the like, formerly employed in buff paints, and also are superior to the buff titanium dioxide pigment products of U. S. Patent 2,062,137. For instance, the employment of said buff titanium dioxide pigments in outside paints, such as oil type paints, orthodox and alkyd resin enamels, pyroxylin lacquers, and the like, applied to wood, metal, etc., exposed to the elements, results in films which chalk definitely less than do those comprising the aforementioned prior art pigment mixtures. In addition, when the hereinbefore described novel buff titanium dioxide pigment comprising films do chalk on excessive exposure, the chalk is colored and the objectionable whitening effects noted when paints containing mixtures of white and colored pigments are employed, are not evident.

As many apparently widely different embodiments of this invention may be made without departing from the spirit and scope thereof, it is to be understood that we do not limit ourselves to the specific embodiments except as defined in the appended claims.

Having described the present invention the following is claimed as new and useful.

1. A process for producing improved buff titanium pigments which comprises calcining at a temperature between about 800° C. and about 1050° C. an intimate mixture comprising a titanium pigment, a chromium compound, and an alkali metal salt, said calcination being conducted for a part of the time in a carbon monoxide free oxygen comprising atmosphere and for a part of the time in a carbon monoxide and oxygen comprising atmosphere.

2. A process for producing improved buff titanium pigments which comprises calcining at a temperature between about 800° C. and about 1050° C. an intimate mixture comprising a titanium pigment, a chromium compound, and an alkali metal salt in a carbon monoxide free oxygen comprising atmosphere and thereafter in a carbon monoxide and oxygen comprising atmosphere.

3. A process for producing improved buff titanium pigments which comprises calcining at a temperature between about 800° C. and about 1050° C. for a period of time between about 15 minutes and about 7 hours an intimate mixture comprising a titanium pigment, a chromium compound, and an alkali metal salt, said mixture being subjected during said calcination first to a carbon monoxide free oxygen comprising atmosphere and thereafter to a carbon monoxide and oxygen comprising atmosphere.

4. A process for producing improved buff titanium pigments which comprises calcining at a temperature between about 800° C. and about 1050° C. for a period of time between about 15 minutes and about 7 hours an intimate mixture comprising a titanium pigment, between about 0.01% and about 2.5%, calculated as elemental chromium and based upon the weight of the titanium pigment, of a chromium compound and between about 0.3% and about 3%, calculated as alkali metal and based upon the weight of the titanium pigment of an alkali metal salt, said calcination being conducted first in a carbon monoxide free oxygen comprising atmosphere for a period of not more than about 5 hours and thereafter in a carbon monoxide and oxygen comprising atmosphere for a period of not more than about two hours.

5. A process for producing improved titanium pigments which comprises calcining at a temperature between about 800° C. and about 1050° C. for a period of time between about 15 minutes and about 7 hours an intimate mixture comprising a titanium pigment, between about 0.02% and about 2%, calculated as elemental chromium and based upon the weight of the titanium pigment of a chromium compound, and between about 0.3% and about 3%, calculated as potassium and based upon the weight of the titanium pigment, of a potassium salt, said calcination first being conducted for not more than about 2 hours in a carbon monoxide free oxygen comprising atmosphere and thereafter for not more than about one hour in a carbon monoxide and oxygen comprising atmosphere.

6. A process for producing improved buff titanium pigments which comprises calcining at a temperature between about 900° C. and about 1050° C. an intimate mixture comprising a titanium pigment, between about 0.03% and about 0.75%, calculated as elemental chromium and based upon the weight of the titanium pigment of a chromium compound, and between about 0.3% and about 3%, calculated as potassium and based upon the weight of the titanium pigment, of potassium carbonate, said calcination first being conducted for not more than about 2 hours in a carbon monoxide free oxygen comprising atmosphere and thereafter for not more than about one hour in a carbon monoxide and oxygen comprising atmosphere.

7. A process for producing improved buff titanium pigments which comprises taking an aqueous suspension of a titanium dioxide pigment and adding thereto between about 0.03% and about 0.75%, calculated as elemental chromium and based upon the weight of the titanium dioxide of chromic acid, and from about 0.3% and about 3%, calculated as potassium and based upon the weight of the titanium dioxide, of potassium carbonate, calcining at a temperature between about 900° C. and about 1050° C. in a carbon monoxide free oxygen comprising atmosphere for a period of not more than about 2 hours and thereafter continuing said calcination in a carbon monoxide and oxygen comprising atmosphere, comprising from about 0.1% to about 2% carbon monoxide for a period of time not exceeding about one hour, and thereafter cooling the calcined pigment in an oxygen comprising atmosphere substantially free from carbon monoxide.

HOLGER H. SCHAUMANN.
ROBERT K. WHITTEN.